(12) United States Patent
Deck et al.

(10) Patent No.: US 10,647,406 B2
(45) Date of Patent: May 12, 2020

(54) CLOSED-ANGLE COMPOSITE AIRFOIL SPAR AND METHOD OF FABRICATING THE SAME

(71) Applicant: The Boeing Company, Chicago, IL (US)

(72) Inventors: Eric E Deck, Ladue, MO (US); Charles Alan Rhodes, O'Fallon, MO (US); Jeffry K Berner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 15/610,922

(22) Filed: Jun. 1, 2017

(65) Prior Publication Data
US 2018/0346094 A1    Dec. 6, 2018

(51) Int. Cl.
| | | |
|---|---|---|
| *B64C 3/18* | (2006.01) | |
| *B64C 3/20* | (2006.01) | |
| *B64C 3/24* | (2006.01) | |
| *B64C 3/26* | (2006.01) | |

(52) U.S. Cl.
CPC .............. *B64C 3/185* (2013.01); *B64C 3/20* (2013.01); *B64C 3/24* (2013.01); *B64C 3/26* (2013.01)

(58) Field of Classification Search
CPC .. B64C 1/065; B64C 3/20; B64C 3/24; B64C 3/26; B64C 3/185
See application file for complete search history.

(56) References Cited

U.S. PATENT DOCUMENTS

| | | | | |
|---|---|---|---|---|
| 4,095,322 A | * | 6/1978 | Scarpati | B29C 70/345 |
| | | | | 156/182 |
| 4,565,595 A | * | 1/1986 | Whitener | B29C 70/08 |
| | | | | 156/156 |
| 6,234,423 B1 | | 5/2001 | Hirahara et al. | |
| 7,871,041 B2 | * | 1/2011 | Brice | B64F 5/00 |
| | | | | 244/123.1 |
| 8,973,871 B2 | * | 3/2015 | Marcoe | B64C 3/185 |
| | | | | 244/123.7 |
| 2001/0017336 A1 | * | 8/2001 | Hirahara | B64C 3/18 |
| | | | | 244/123.7 |

(Continued)

FOREIGN PATENT DOCUMENTS

WO    WO 2014/170693    10/2014

OTHER PUBLICATIONS

European Patent Office, "Extended Search Report," App. No. 18169646.9 (dated Jun. 11, 2018).

(Continued)

*Primary Examiner* — Philip J Bonzell
*Assistant Examiner* — Tye William Abell
(74) *Attorney, Agent, or Firm* — Walters & Wasylyna LLC

(57) ABSTRACT

A closed-angle composite airfoil spar is provided for an airfoil assembly. The composite airfoil spar comprises a web portion having a thickness. The composite airfoil spar also comprises a flange portion having a thickness. The flange portion extends transverse to the web portion. The composite airfoil spar further comprises a radius portion interconnecting the web and flange portions. The radius portion is an acceptable amount thinner relative to thickness of the web portion and thickness of the flange portion based on design requirements and material properties.

35 Claims, 7 Drawing Sheets

(56) References Cited

U.S. PATENT DOCUMENTS

| | | | |
|---|---|---|---|
| 2007/0018049 A1* | 1/2007 | Stuhr | B64C 23/069 244/124 |
| 2010/0178453 A1* | 7/2010 | Wood | B29C 70/30 428/119 |
| 2014/0117166 A1* | 5/2014 | Campbell, Jr. | B64C 23/069 244/199.4 |
| 2016/0075429 A1* | 3/2016 | Fong | B64F 5/10 244/199.4 |

OTHER PUBLICATIONS

K.-T. Hsiao et al: "Vacuum assisted resin transfer molding (VARTM) in polymer matrix composites", In: "Manufacturing Techniques for Polymer Matrix Composites (PMCs)", Elsevier, (Jan. 1, 2012).

T.H. Hou et al: "Evaluation of Double-Vacuum-Bag Process for Composite Fabrication", URL: https://ntrs.nasa.gov/archive/nasa/casi.ntrs.nasa.gov/20040073434.pdf (0/16/2004).

Karen Mason: "Autoclave Quality Outside the Autoclave?: CompositesWorld", URL:https://www.compositesworld.com/articles/autoclave-quality-outside-the-autoclave (Jan. 3, 2006).

Derek J Quade et al: "Comparison of Autoclave and Out-of-Autoclave Composites", NASA Technical Reports Server, (Oct. 11, 2010).

Julien Cauberghs: "Out-of-Autoclave Manufacturing of Aerospace Representative Parts", URL: http://digitool.library.mcgill.ca/thesisfile106593.pdf (Jan. 1, 2012).

Www Cytec Industries Inc. : "CYCOM 5320-1 Epoxy Resin System", URL: https://www.cytec.com/sites/default/files/datasheets/CYCOM%205320-1%20Rev%20CR5.pdf (Oct. 1, 2015).

* cited by examiner

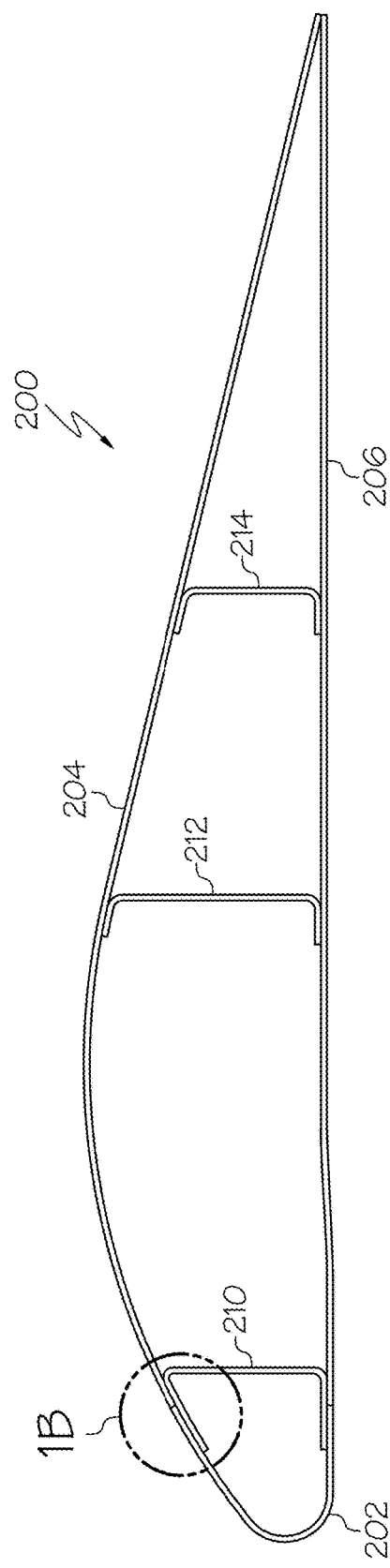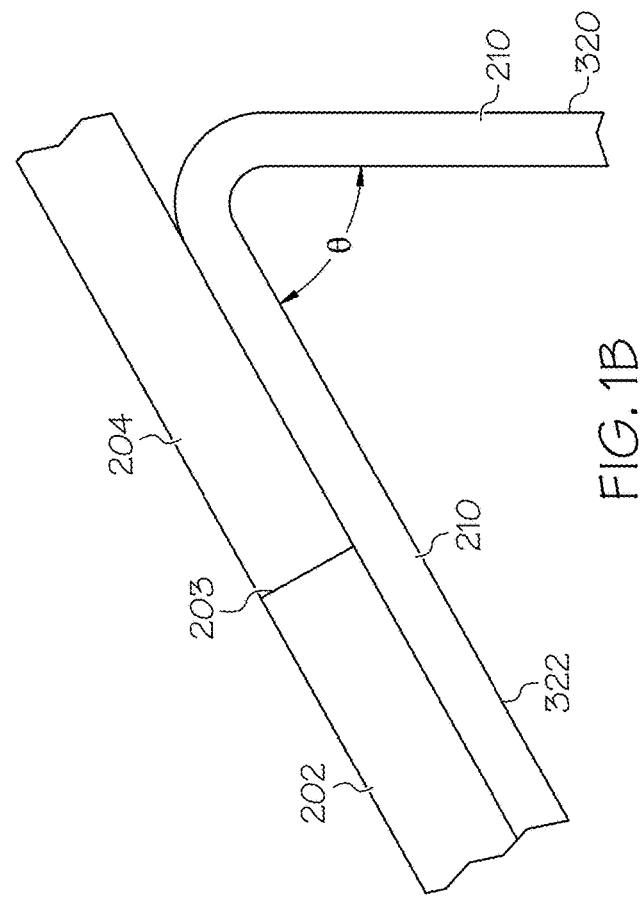
FIG. 1A
FIG. 1B

CLOSED-ANGLE COMPOSITE AIRFOIL SPAR AND METHOD OF FABRICATING THE SAME

FIELD

The present application relates to composite airfoil assemblies, and is particularly directed to a closed-angle composite airfoil spar and a method of fabricating the same.

BACKGROUND

A typical known airfoil assembly includes an upper skin panel, a lower skin panel, and a number of composite spars interconnecting the upper and lower skin panels. The composite spars usually include a number of open-angle "C"-shaped spars (i.e., an angle of the upper flange or the lower flange at a web interface is slightly greater than 90°, making it an obtuse angle). Each open-angle spar faces (i.e., opens towards) either in the forward direction of the airfoil assembly or in the aft direction of the airfoil assembly depending upon the location of the particular spar. If the open-angle spar is located in a rear portion of the airfoil assembly, the spar generally faces forward of the airfoil assembly. If the open-angle spar is located in a front portion of the airfoil assembly, the spar generally faces in the aft direction of the airfoil assembly.

However, in some implementations of airfoil assemblies, a closed-angle spar (i.e., a spar where the upper flange, the lower flange, or both flanges develop an angle with the web that is less than 90°, making it an acute angle) is located in the front portion of the airfoil assembly. In these implementations, the closed-angle spar faces (i.e., opens towards) in the forward direction of the airfoil assembly like an open-angle spar located in the rear portion of the airfoil assembly. Accordingly, those skilled in the art continue with research and development efforts in the field of airfoil assemblies including composite closed-angle spars.

SUMMARY

In one aspect, a closed-angle composite airfoil spar is provided for an airfoil assembly. The composite airfoil spar comprises a web portion having a thickness. The composite airfoil spar further comprises an elongated flange portion having a thickness and extending transverse to the web portion. The elongated flange portion forms an acute angle between the web portion and the elongated flange portion. The elongated flange portion serves as a splice between a leading edge and a skin panel of the airfoil assembly.

In another aspect, an airfoil assembly comprises a leading edge and a skin panel abutting the leading edge. The airfoil assembly further comprises a closed-angle spar having an elongated flange portion and a web portion that forms an acute angle between the elongated flange portion and the web portion. The elongated flange portion serves as a splice at a splice point along the elongated flange portion between the leading edge and the skin panel.

In another aspect, a closed-angle composite airfoil spar is provided for an airfoil assembly. The composite airfoil spar comprises a web portion having a thickness. The composite airfoil spar also comprises a flange portion having a thickness. The flange portion extends transverse to the web portion. The composite airfoil spar further comprises a radius portion interconnecting the web and flange portions. The radius portion is an acceptable amount thinner relative to thickness of the web portion and thickness of the flange portion based on design requirements and material properties.

In another aspect, a method is provided of fabricating a closed-angle composite airfoil spar having a closed angle of no more than 80 degrees. The method comprises applying layers of a fiber reinforced material to a tooling piece to build up layers of the fiber reinforced material on the tooling piece. The method further comprises drawing a vacuum about the tooling piece including the layers of fiber reinforced material on the tooling piece for at least a first predetermined process time. The method also comprises heating the tooling piece including the layers of the fiber reinforced material on the tooling piece for at least a second predetermined process time. The method also comprises, after elapse of the first predetermined process time, releasing the vacuum drawn about the tooling piece including the layers of fiber reinforced material on the tooling piece to produce the closed-angle composite airfoil spar having a closed angle no more than 80 degrees.

In another aspect, a method is provided of assembling an airfoil assembly having a leading edge and a skin panel that abuts the leading edge. The method comprises providing a close-angle spar having an elongated flange portion and a web portion that forms an acute angle between the elongated flange portion and the web portion. The method further comprises splicing the leading edge and the skin panel at a splice point along the elongated flange portion of the closed-angle spar.

In another aspect, a method is provided for fabricating a closed-angle composite airfoil spar. The method includes applying layers of a fiber reinforced material to a tooling piece to build up layers of the fiber reinforced material on the tooling piece and produce the closed-angle composite airfoil spar having an acute angle. The fiber reinforced material includes an epoxy material that facilitates controlled flow and is relatively less mobile while crosslinking.

Other aspects will become apparent from the following detailed description, the accompanying drawings and the appended claims.

BRIEF DESCRIPTION OF THE DRAWINGS

FIG. 1A is an example airfoil assembly embodying a closed-angle composite airfoil spar in accordance with an embodiment.

FIG. 1B is an enlarged view of FIG. 1A, taken approximately in the area labeled as circle "1B" shown in FIG. 1A.

DETAILED DESCRIPTION

Figure 3:
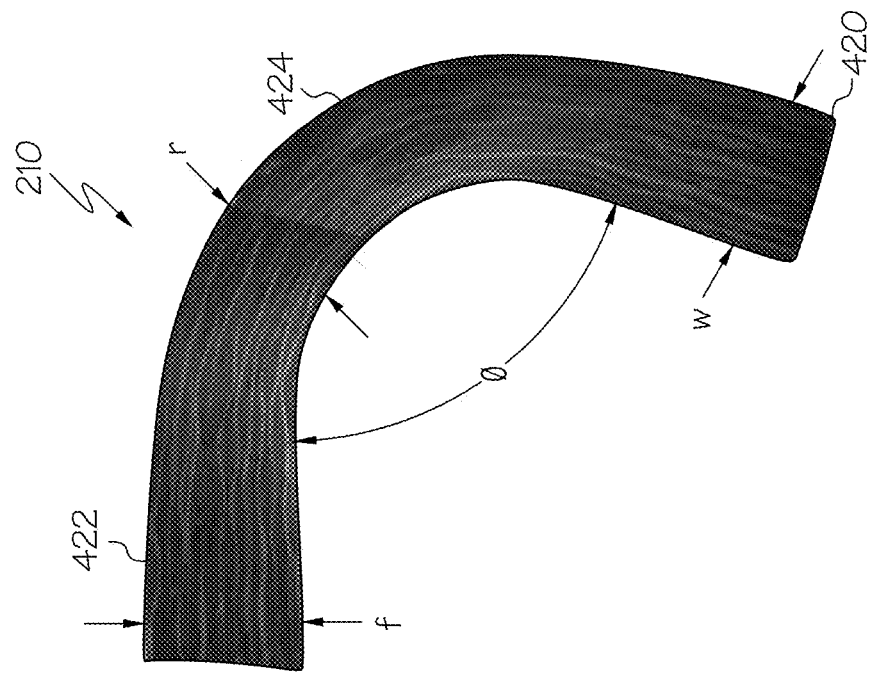
FIG. 3 is an enlarged view similar to FIG. 1B, and showing only the closed-angle composite airfoil spar in accordance with another example embodiment.

The present application is directed to closed-angle composite airfoil spars and methods of fabricating the same. The specific composite airfoil spar, fabricating method, and the industry in which the composite airfoil spar and fabricating method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes composite airfoil spars and fabricating methods for aircraft. More specifically, the disclosure below describes a composite airfoil spar for use in an airfoil assembly of an aircraft. The composite airfoil spar and method of fabricating the composite airfoil spar may be implemented by an original equipment manufacturer (OEM) for manufacturing composite airfoil spars in compliance with military and space regulations.

Referring to FIG. 1A and FIG. 1B (referred to herein collectively as "FIG. 1"), an example airfoil assembly 200 embodying a closed-angle composite airfoil spar in accordance with an embodiment is illustrated. Airfoil assembly 200 includes a leading edge (e.g., nose fitting) 202, an upper skin panel 204, and a lower skin panel 206. The leading edge 202 is located at front of the airfoil assembly 200. The airfoil assembly 200 further includes one spar 210 (front spar) located at front portion of the airfoil assembly 200, and two spars 212, 214 (center spar and aft spar) located at rear portion of the airfoil assembly 200. The one spar 210 located at the front portion is a closed angle spar (i.e., the spar forms an acute angle less than 90°) that faces forward of the airfoil assembly 200. The one spar 210 may have a cross-sectional shape resembling the letter "C," as best shown in FIG. 1A. The two spars 212, 214 located at the rear portion are open-angle spars that face forward of the airfoil assembly 200. While each of the two spars 212, 214 is shown as having an obtuse angle and facing forward of the airfoil assembly 200, it is conceivable that the spar be constructed with an acute angle and face aft of the airfoil assembly 200.

A top part of each of the two spars 212, 214 is fastened directly to the upper skin panel 204. Similarly, a bottom part of each of the two spars 212, 214 is fastened directly to the lower skin panel 206.

As best shown in FIG. 1B, a top part (the elongated flange portion 322) of the one spar 210 may be fastened directly to the upper skin panel 204 and the leading edge 202 proximate the junction 203 where the upper skin panel 204 and the leading edge 202 meet. The web portion 320 of the spar 210 is located aft of the junction 203 between the upper skin panel 204 and the leading edge 202.

Similarly, a bottom part of the one spar 210 is fastened directly to the lower skin panel 206 and the leading edge 202 at the junction where the lower skin panel 206 and the leading edge 202 meet.

A spar and a skin panel can be directly fastened together using any suitable technique. For example, a spar and a skin panel can be directly co-bonded together using a suitable bonding material. As another example, a spar and a skin panel can be mechanically fastened together using suitable mechanical fasteners.

While the airfoil assembly 200 is shown and described having three spars (i.e., the one closed-angle spar 210 and the two open-angle spars 212, 214), additional closed-angle spars and/or additional open-angle spars, may be included in the airfoil assembly 200 without departing from the scope of the present disclosure. Also, those skilled in the art will appreciate that only a portion of the closed-angle composite airfoil spar 210 is shown in FIG. 1, and that the overall size and shape of the composite airfoil spar 210 may depend on the end application. The disclosed composite airfoil spar 210 may be sized, shaped, and contoured accordingly.

Figure 2:
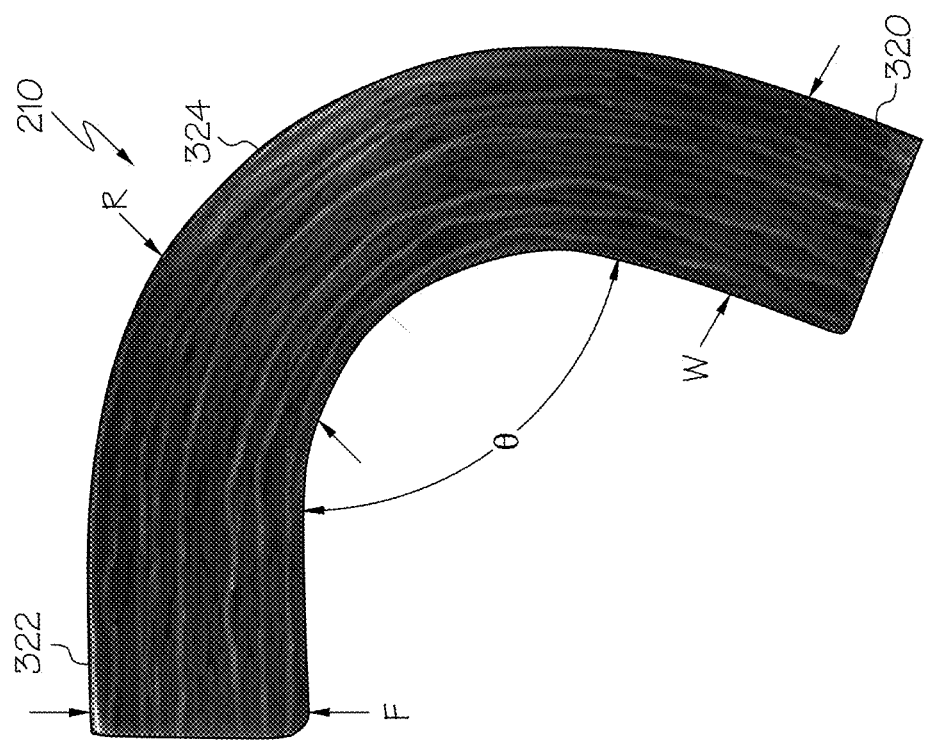
FIG. 2 is an enlarged view similar to FIG. 1B, and showing only the closed-angle composite airfoil spar in accordance with an example embodiment.

Referring to FIG. 2, an enlarged view of a portion of the closed-angle composite airfoil spar 210 shown in FIG. 1A in accordance with an example embodiment is illustrated. In particular, the composite airfoil spar 210 comprises a web portion 320 having a thickness of 0.220+/−0.005 inches (5.6+/−0.1 millimeters). The composite airfoil spar 310 also comprises a flange portion 322 having a thickness of 0.220+/−0.005 inches (5.6+/−0.1 millimeters). The flange portion 322 extends transverse to the web portion 320. The composite airfoil spar 210 further comprises a radius portion 324 interconnecting the web and flange portions 320, 322. The radius portion 324 has a thickness of about 0.210+/−0.005 inches (5.3+/−0.1 millimeters). In the example embodiment shown in FIG. 3, the radius portion 324 is an acceptable amount thinner relative to the thickness of the web portion 320 and the thickness of the flange portion 322 based on design requirements and material properties. In some embodiments, the radius portion 324 is no more than ten (10) percent thinner relative to the thickness of the web portion 320 and the thickness of the flange portion 322. In some embodiments, the radius portion 324 is no more than five (5) percent thinner relative to the thickness of the web portion 320 and the thickness of the flange portion 322. The radius portion 324 has a radius in the range typically between a minimum of about 0.25 inches (0.64 centimeters) and a maximum of about one inch (2.54 centimeters).

Compositionally, the material of the composite airfoil spar 210 including the web portion 320, the flange portion 322, and the radius portion 324 comprises fiber reinforced material. The fiber reinforced material may include reinforcing fibers (e.g., carbon fibers, glass fibers or the like) in a matrix material (e.g., thermosetting resin). In some embodiments, the fiber reinforced material comprises reinforcing fibers in an epoxy material (the matrix material).

In a particular implementation, the epoxy material of the fiber reinforced material may be a resin system with curatives that allow the epoxy material to gel relatively early on the temperature scale, such as between 240° F. and 260° F. (e.g., at about 250° F.). Such an epoxy material may facilitate more controlled flow and may be less mobile while crosslinking, thereby reducing (if not eliminating) the radius thinning described herein. As an example of such an epoxy material, the composite airfoil spar 210 is fabricated from CYCOM® 5320-1 epoxy resin, which is commercially available from Cytec Industries, Inc. CYCOM is a registered trademark of Cytec Industries, Inc. CYCOM® 5320-1 epoxy resin may be cured using an out-of-autoclave process (e.g., in an oven at atmospheric pressure). Other materials are possible in other embodiments.

The radius portion 324 is shown in the example embodiment of FIG. 2. The average thickness of the web portion 320 is 0.220+/−0.005 inches (5.6+/−0.1 millimeters) designated as "W", the average thickness of the flange portion 322 is 0.220+/−0.005 inches (5.6+/−0.1 millimeters) designated as "F", and the average thickness of the radius portion 324 is 0.210+/−0.005 inches (5.3+/−0.1 millimeters) designated as "R". Thus, the average thinning of the radius portion 324 is about five (5) percent of the average thickness of the web portion 320, and about five (5) percent of the average thickness of the flange portion 322.

In some embodiments, the radius portion 324 of the spar 210 forms an acute angle (designated as angle "θ" in FIG. 2) no greater than 90 degrees between the web portion 320 and the flange portion 322. In some embodiments, the radius portion 324 forms an acute angle θ of at most 80 degrees between the web portion 320 and the flange portion 322. In other embodiments, the radius portion 324 forms an acute angle θ no greater than 70 degrees between the web portion 320 and the flange portion 322. In still other embodiments, the radius portion 324 forms an acute angle θ no greater than 60 degrees between the web portion 320 and the flange portion 322.

Referring to FIG. 3, an enlarged view of a portion of the closed-angle composite airfoil spar 210 shown in FIG. 1A in accordance with another example embodiment is illustrated. In particular, the composite airfoil spar 210 comprises a web portion 420 having a thickness of 0.210+/−0.005 inches (5.3+/−0.1 millimeters). The composite airfoil spar 210 also comprises a flange portion 422 having a thickness of 0.220+/−0.005 inches (5.6+/−0.1 millimeters). The flange portion 422 extends transverse to the web portion 420. The composite airfoil spar 210 further comprises a radius portion 424 interconnecting the web and flange portions 420, 422. The radius portion 424 has a thickness of 0.185+/−0.005 inches (4.7+/−0.1 millimeters). In the example embodiment shown in FIG. 3, the radius portion 424 is an acceptable amount thinner relative to the thickness of the web portion 420 and the thickness of the flange portion 422 based on design requirements and material properties. In some embodiments, the radius portion 424 is no more than fifteen (15) percent thinner relative to the thickness of the web portion 420 and the thickness of the flange portion 422. The radius portion 424 has a radius in the range typically between a minimum of about 0.25 inches (0.64 centimeters) and a maximum of about one inch (2.54 centimeters). By making the composite airfoil spar 210 using the manufacturing method disclosed herein, the problems associated with radius thinning are avoided or at least minimized.

Compositionally, the material of the composite airfoil spar 210 including the web portion 320, the flange portion 322, and the radius portion 324 comprises fiber reinforced material. The fiber reinforced material may include reinforcing fibers (e.g., carbon fibers, glass fibers or the like) in a matrix material (e.g., thermosetting resin). In some embodiments, the fiber reinforced material comprises carbon fiber in an epoxy material. As an example, the composite airfoil spar 210 is fabricated from CYCOM® 970 epoxy resin, which commercially available from Cytec Industries, Inc. CYCOM is a registered trademark of Cytec Industries, Inc. Other materials are possible in other embodiments.

The radius portion 424 is shown in the example embodiment of FIG. 3. The average thickness of the web portion 420 is about 0.210 inches (5.3 millimeters) designated as "w", the average thickness of the flange portion 422 is about 0.220 inches (5.6 millimeters) designated as "f", and the average thickness of the radius portion 424 is about 0.185 inches (4.7 millimeters) designated as "r". Thus, the average thinning of the radius portion 424 is about eleven (11) percent of the average thickness of the web portion 420, and about fifteen (15) percent of the average thickness of the flange portion 422.

In some embodiments, the radius portion 424 of the spar 210 forms an acute angle (designated as angle "∅" in FIG. 3) no greater than 90 degrees between the web portion 420 and the flange portion 422. In some embodiments, the radius portion 424 forms an acute angle ∅ no greater than 80 degrees between the web portion 420 and the flange portion 422. In other embodiments, the radius portion 424 forms an acute angle ∅ no greater than 70 degrees between the web portion 420 and the flange portion 422. In other embodiments, the radius portion 424 forms an acute angle ∅ no greater than 60 degrees between the web portion 420 and the flange portion 422.

Figure 4:
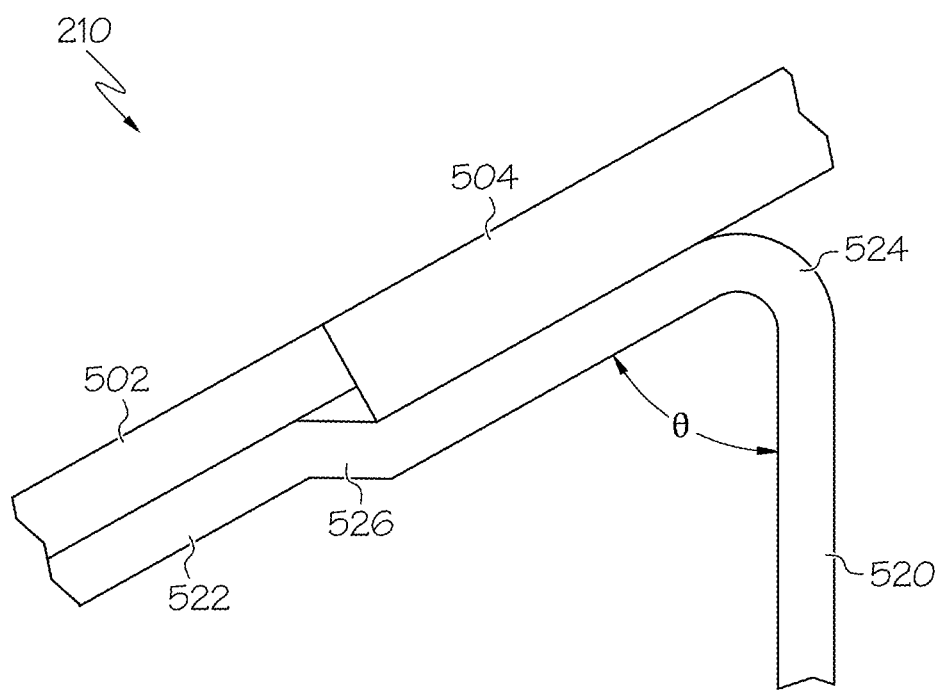
FIG. 4 is an enlarged view similar to FIG. 1B, and showing the closed-angle composite airfoil spar in accordance with still another example embodiment.

Referring to FIG. 4, an enlarged view of a portion of the composite airfoil spar 210 shown in FIG. 1A in accordance with still another example embodiment is illustrated. The composite airfoil spar 210 comprises a web portion 520, an elongated (i.e., wider) flange portion 522, and a radius portion 524 interconnecting the web portion 520 and the flange portion 522. The flange portion 522 includes a joggle 526 that is located between the radius portion 524 and end of the flange portion 522. The use of joggle 526 is especially advantageous when there is a difference in thickness between leading edge (e.g., nose fitting) 502 and upper skin panel 504. As shown in FIG. 4, the leading edge 502 has a thickness that is less than the thickness of the upper skin panel 504. The joggle 526 is angled and formed such that one part of the flange portion 522 abuts flat against the leading edge 502 and another part of the flange portion 522 abuts flat against the upper skin panel 504. By providing the elongated flange portion 522 and locating the composite airfoil spar 210 a little further aft of the airfoil assembly 200 (see FIG. 1A), the spar 210 can be attached to the leading edge 202 and the upper skin panel 204 without using a splice plate. In other words, the elongated flange portion 522 itself serves as a splice between the leading edge 502 and the skin panel 504.

The following example illustrates a method of fabricating a composite airfoil spar in accordance with an embodiment. The example fabricating method is intended to illustrate, but in no way limits, the scope of the disclosure.

Figure 5:
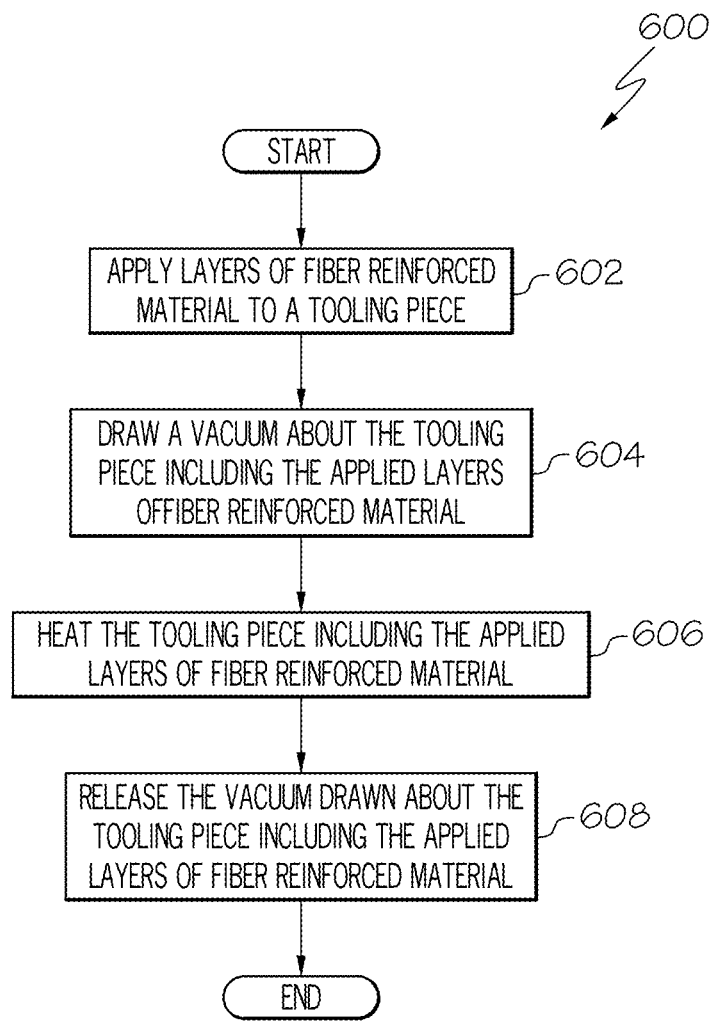
FIG. 5 is a flow diagram illustrating an example method of fabricating a closed-angle composite airfoil spar in accordance with an example embodiment.

Referring to FIG. 5, a flow diagram 600 is shown illustrating an example method of fabricating example composite airfoil spar 210 of FIG. 1A in accordance with an embodiment. The fabricating method 600 disclosed herein may be employed according to military and space regulations, for example. In some embodiments, the method comprises an out-of-autoclave method, such as described herein.

In block 602, a number of layers of a fiber reinforced material is applied to a tooling piece to build up layers of the fiber reinforced material. In some embodiments, the layers are applied to the tooling piece to build up a minimum number of layers of the fiber reinforced material on the tooling piece. In some embodiments, the layers are applied with periodic compaction. In some embodiments, the fiber reinforced material can be selected from many commercially available materials. For example, the fiber reinforced material can be selected from one of a carbon fiber reinforced polymer material and a fiber reinforced epoxy material. In block 604, a vacuum is drawn about the tooling piece including the layers of the fiber reinforced material on the tooling piece for at least a first predetermined process time. In some embodiments, the drawing a vacuum about the tooling piece including the layers of fiber reinforced material on the tooling piece for at least a first predetermined process time includes drawing a vacuum about the tooling piece including the layers of fiber reinforced material on the tooling piece for a minimum time specified by a manufacturer of the fiber reinforced material.

Then in block 606, the tooling piece including the layers of the fiber reinforced material on the tooling piece are heated for at least a second predetermined process time. In one particular implementation, heating (block 606) may be an out-of-autoclave process. For example, heating (block 606) may be performed in an oven at atmospheric pressure (e.g., about 1 atm).

In some embodiments, the heating (block 606) the tooling piece including the layers of the fiber reinforced material on the tooling piece for at least a second predetermined process time includes heating the tooling piece including the layers of the fiber reinforced material on the tooling piece for a minimum time specified by a manufacturer of the fiber reinforced material.

After elapse of the first predetermined process time, the vacuum drawn about the tooling piece including the layers of fiber reinforced material on the tooling piece is released to produce the composite airfoil spar, as shown in block 608. In some embodiments, the fabricated composite airfoil spar has a closed angle no more than 90 degrees. In some embodiments, the fabricated composite airfoil spar has a closed angle no more than 80 degrees. In other embodiments, the fabricated composite airfoil spar has a closed angle no more than 70 degrees. In still other embodiments, the fabricated composite airfoil spar has a closed angle no more than 60 degrees In some embodiments, the fabricated composite airfoil spar includes a spar radius portion having a thickness that is an acceptable amount thinner than thickness of a spar web portion on one side of the spar radius portion and thickness of a spar flange portion on an opposite side of the spar radius portion. As an example, the spar radius portion has a thickness that is no more than five (5) percent thinner than the thickness of the spar web portion on the one side of the spar radius portion and the thickness of the spar flange portion on the opposite side of the spar radius portion. The fabricating process then ends.

Figure 6A:
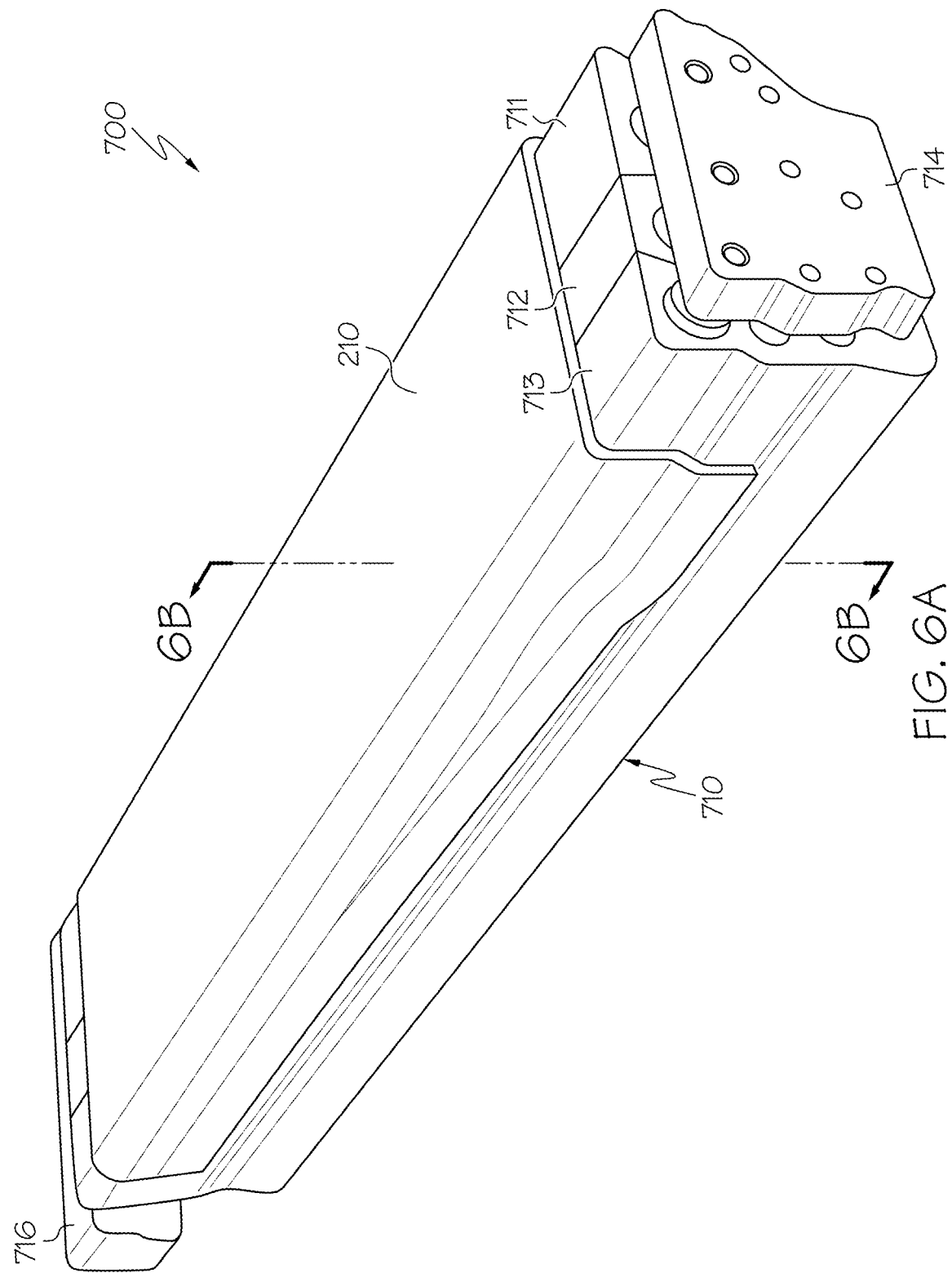
FIG. 6A is an example tooling configuration for implementing the example fabrication method of FIG. 5.

The above-described example fabricating method may be carried out using manufacturing systems or apparatus suitable for making composite layered structures such as composite airfoil spars. Referring to FIG. 6A, an example tooling piece 700 for implementing the example fabrication method of FIG. 5 is illustrated. Tooling piece 700 is a male tool configuration having a segmented mandrel assembly 710, such as with three mandrel pieces 711, 712, 713. The three mandrel pieces 711, 712, 713 are bolted and pinned together using end fittings 714, 716.

During the fabrication process, fiber reinforced material is applied in layers onto the temporarily joined three mandrel pieces 711, 712, 713 to build up layers of the material. The mandrel assembly 710 including the layers of fiber reinforced material is then placed in an envelope bag (not shown). A vacuum is drawn about the envelope bag. The part and tool are heated for a predetermined time period and then allowed to cool. The vacuum is then released to produce a composite airfoil spar that is subsequently removed from the mandrel assembly 710.

The example tooling piece 700 of FIG. 6A is a tooling option that is different and relatively inexpensive as compared to known tooling options for making closed-angle spars. Moreover, dimensional tolerance is improved by using the tooling piece 700 of FIG. 6A. The improved dimensional tolerance facilitates tooling assembly, which thereby reduces tooling costs for assembly.

Figure 6B:
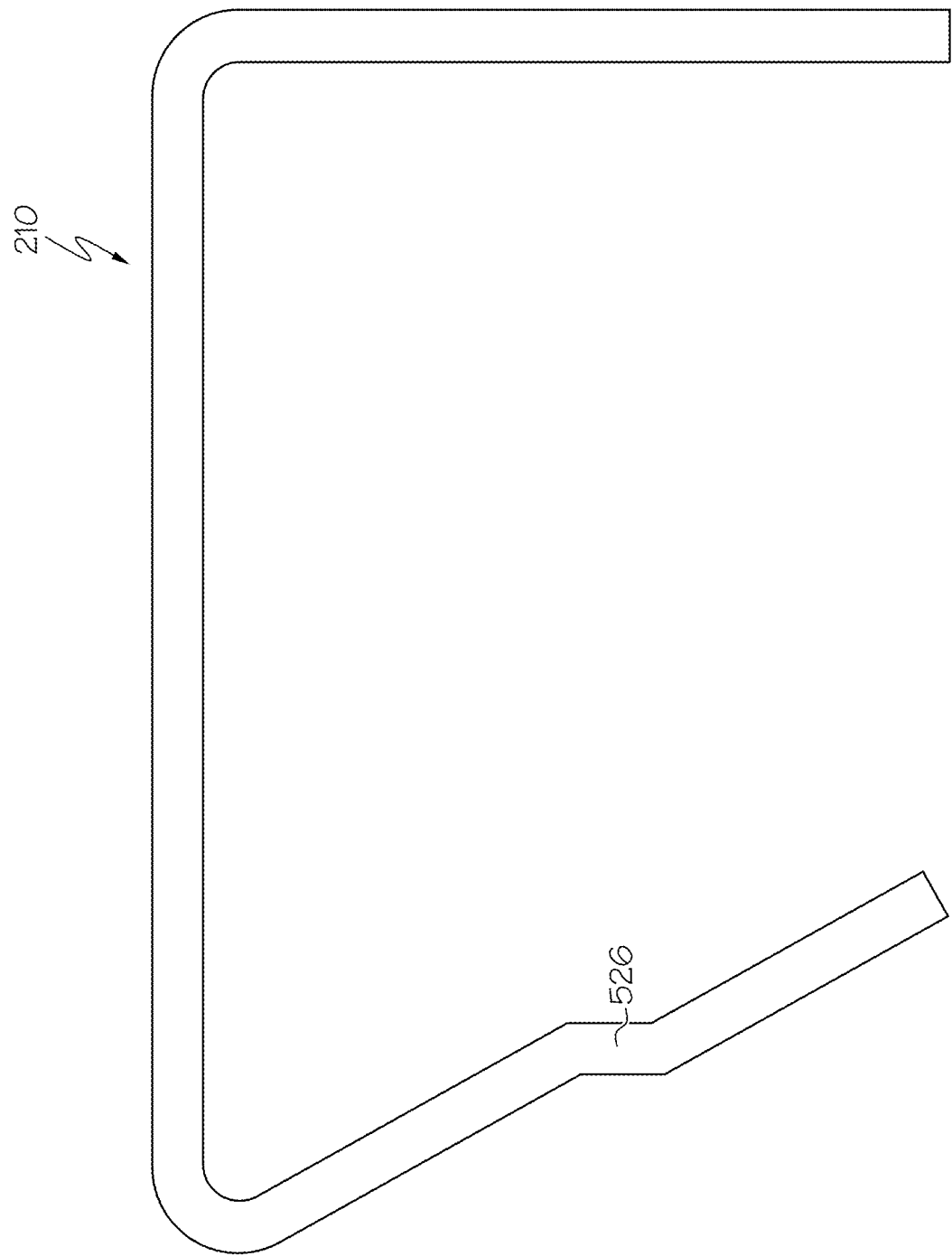
FIG. 6B is a sectional view, taken approximately along line "6B-6B", of FIG. 6A, and showing only the closed-angle composite airfoil spar manufactured using the fabrication method of FIG. 5.

Referring to FIG. 6B, a sectional view is taken approximately along line "6B-6B", of FIG. 6A, with certain parts removed. More specifically, FIG. 6B shows only the closed-angle composite airfoil spar 210 with the joggle 526 of FIG. 4 manufactured using the fabrication method of FIG. 5. The example tooling piece 700 of FIG. 6A can be modified to fabricate an airfoil spar without a joggle, such as the airfoil spar 210 shown in FIG. 1B.

At this point, those skilled in the art will appreciate that using a tooling piece 700 having a segmented mandrel assembly 710, as shown in FIG. 6A, may facilitate release and separation of the composite airfoil spar 210 from the tooling piece 700 without damaging the cured composite airfoil spar 210, thereby facilitating the fabrication of composite airfoil spars having an acute angle θ between the web portion 320 and the flange portion 322 and, if desired, relatively more complex geometries, as shown in FIG. 1B. For example, the acute angle θ may be no greater than 80 degrees and, as shown in FIG. 4, the flange portion 522 may include a joggle 526.

It should be apparent that although the above description describes a vacuum-based fabricating method to make a composite airfoil spar, it is conceivable that other fabricating methods may be used. Numerous other manufacturing systems or apparatus for making composite airfoil spars are available and, therefore, will not be described.

It should also be apparent that a composite airfoil spar fabricated in accordance with the above-described example method and preferred materials can use less fiber reinforced material to produce a composite airfoil spar of comparable strength where radius thinning can be reduced at the junction where the web portion and the flange portion come together due to material capabilities. The result is a lower weight composite airfoil spar as compared to known composite airfoil spars that have higher levels of radius thinning. The lower weight composite airfoil spar can be used as a forward-facing spar in the front portion of an airfoil assembly. The forward-facing spar improves airfoil assembly by providing ease of access to fastening elements during assembly.

It should further be apparent that a composite airfoil spar produced in accordance with above-described example methods is suitable for any type of application. The specific fiber reinforced material of the composite airfoil spar can be selected and tailored depending upon the particular application of the composite airfoil spar.

Figure 7:
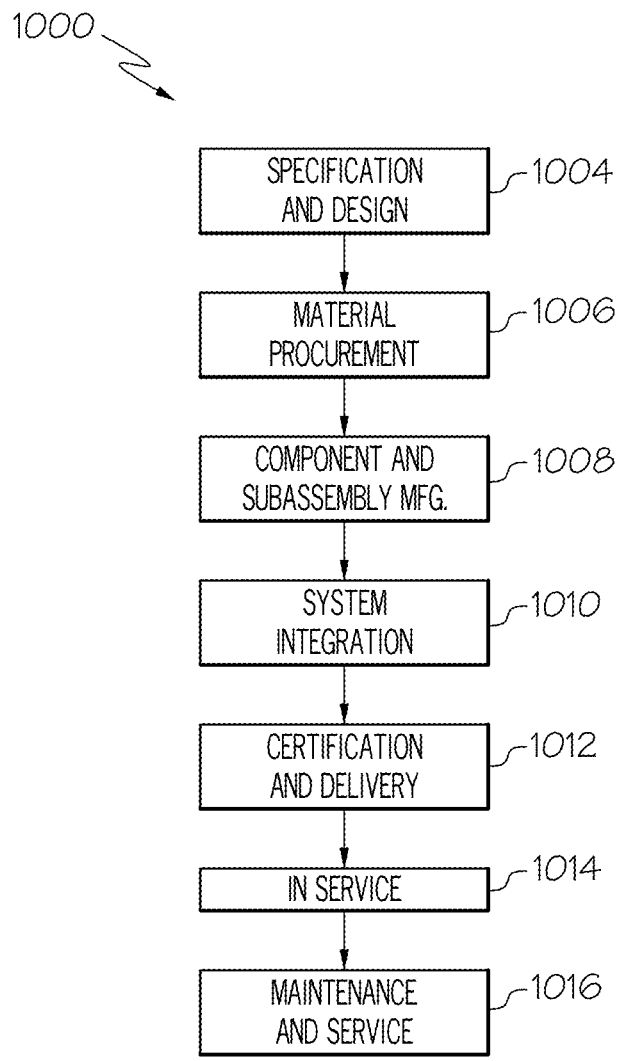
FIG. 7 is a flow diagram of an aircraft manufacturing and service methodology.
Figure 8:
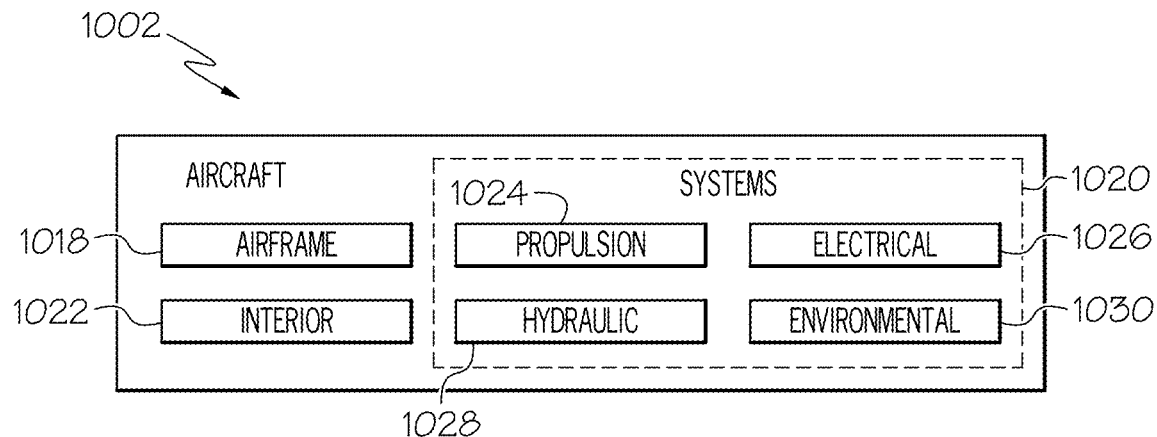
FIG. 8 is a block diagram of an aircraft.

Examples of the disclosure may be described in the context of an aircraft manufacturing and service method 1000, as shown in FIG. 7, and an aircraft 1002, as shown in FIG. 8. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed composite airfoil spars and fabricating methods may be employed during any one or more of the stages of the aircraft manufacturing and service method 1000. As one example, components or subassemblies corresponding to component/subassembly manufacturing 1008, system integration 1010, and or maintenance and service 1016 may be fabricated or manufactured using the disclosed composite airfoil spars and fabricating methods. As another example, the airframe 1018 may be constructed using the disclosed composite airfoil spars and fabricating methods. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed composite airfoil spars and fabricating methods are described in the context of an aircraft; however, one of ordinary skill in the art will readily recognize that the disclosed composite airfoil spars and fabricating methods may be utilized for a variety of applications. For example, the disclosed composite airfoil spars and fabricating methods may be implemented in various types of vehicle including, for example, helicopters, passenger ships, automobiles, marine products (boat, motors, etc.) and the like.

Further, although various embodiments of the disclosed composite airfoil spars and fabricating methods have been shown and described, modifications may occur to those skilled in the art upon reading the specification. The present application includes such modifications and is limited only by the scope of the claims.

What is claimed is:

1. A closed-angle composite airfoil spar for an airfoil assembly, the composite airfoil spar comprising:
a web portion having a web portion thickness;
an elongated flange portion having an elongated flange portion thickness and extending transverse to the web portion and forming an acute angle between the web portion and the elongated flange portion, wherein the elongated flange portion serves as a splice between a leading edge and a skin panel of the airfoil assembly, and wherein the web portion thickness is substantially equal to the elongated flange portion thickness; and
a radius portion interconnecting the web portion and the elongated flange portion, wherein the radius portion has a radius portion thickness, and wherein the radius portion thickness is no more than 10 percent thinner than the web portion thickness and no more than 10 percent thinner than the elongated flange portion thickness.

2. The closed-angle composite airfoil spar of claim 1 wherein the radius portion thickness is no more than 5 percent thinner than the web portion thickness and no more than 5 percent thinner than the elongated flange portion thickness.

3. The closed-angle composite airfoil spar of claim 1 wherein the acute angle is at most 80 degrees.

4. The closed-angle composite airfoil spar of claim 1 having a cross-sectional shape resembling the letter "C".

5. The closed-angle composite airfoil spar of claim 1 wherein the web portion thickness is 0.220+/−0.005 inches (5.6+/−0.1 millimeters), the elongated flange portion thickness is 0.220+/−0.005 inches (5.6+/−0.1 millimeters), and the radius portion thickness is 0.210+/−0.005 inches (5.3+/−0.1 millimeters).

6. The closed-angle composite airfoil spar of claim 1 wherein the radius portion thickness is no more than 5 percent thinner than the web portion thickness and no more than 5 percent thinner than the elongated flange portion thickness.

7. The closed-angle composite airfoil spar of claim 1 wherein the flange portion comprises a joggle that is elongated along a longitudinal length of the flange portion.

8. The closed-angle composite airfoil spar of claim 1 wherein the splice is between a leading edge and an upper skin panel of the airfoil assembly.

9. The closed-angle composite airfoil spar of claim 8 wherein the leading edge meets the upper skin panel at a junction, and wherein the web portion is located aft of the junction.

10. The closed-angle composite airfoil spar of claim 1 wherein the material of the web portion, the flange portion, and the radius portion comprises a fiber reinforced material.

11. The closed-angle composite airfoil spar of claim 10 wherein the fiber reinforced material comprises an epoxy material.

12. The closed-angle composite airfoil spar of claim 11 wherein the epoxy material comprises epoxy resin that gels at a temperature between 240° F. and 260° F.

13. The closed-angle composite airfoil spar of claim 11 wherein the fiber reinforced material further comprises carbon fibers.

14. An airfoil assembly comprising:
a leading edge;
a skin panel abutting the leading edge; and
a closed-angle spar comprising:
a web portion having a web portion thickness;
an elongated flange portion having an elongated flange portion thickness that is substantially equal to the web portion thickness, the elongated flange portion extending transverse to the web portion and forming an acute angle between the web portion and the elongated flange portion, wherein the elongated flange portion serves as a splice between the leading edge and the skin panel; and
a radius portion interconnecting the web portion and the elongated flange portion, the radius portion having a radius portion thickness that is no more than 10 percent thinner than the web portion thickness and no more than 10 percent thinner than the elongated flange portion thickness.

15. The airfoil assembly of claim 14 wherein the acute angle faces forward of the airfoil assembly after the leading edge and the skin panel are spliced together.

16. The airfoil assembly of claim 14 wherein the web portion is located aft of the splice point after the leading edge and the skin panel are spliced together along the elongated flange portion.

17. The airfoil assembly of claim 14 wherein the closed-angle spar is a forward-facing spar for a front portion of the airfoil assembly.

18. The airfoil assembly of claim 14 wherein the acute angle is at most 80 degrees.

19. The airfoil assembly of claim 14 wherein the web portion thickness is 0.220+/−0.005 inches (5.6+/−0.1 millimeters), the elongated flange portion thickness is 0.220+/−0.005 inches (5.6+/−0.1 millimeters), and the radius portion thickness is 0.210+/−0.005 inches (5.3+/−0.1 millimeters).

20. The airfoil assembly of claim 14 wherein the material of the web portion, the flange portion, and the radius portion comprises a fiber reinforced material.

21. The airfoil assembly of claim 20 wherein the fiber reinforced material comprises an epoxy material and carbon fibers.

22. The airfoil assembly of claim 21 wherein the epoxy material comprises epoxy resin that gels at a temperature between 240° F. and 260° F.

23. A method of fabricating the closed-angle composite airfoil spar of claim 1 comprising:
applying layers of a fiber reinforced material to a tooling piece to build up layers of the fiber reinforced material on the tooling piece, the tooling piece comprising a plurality of temporarily joined mandrel pieces;
drawing a vacuum about the tooling piece including the layers of fiber reinforced material on the tooling piece for at least a first predetermined process time;
heating the tooling piece including the layers of the fiber reinforced material on the tooling piece for at least a second predetermined process time; and
after elapse of the first predetermined process time, releasing the vacuum drawn about the tooling piece including the layers of fiber reinforced material on the tooling piece to produce the closed-angle composite airfoil spar having a closed angle no more than 80 degrees.

24. The method of claim 23 wherein the heating the tooling piece including the layers of the fiber reinforced material on the tooling piece for at least the second predetermined process time includes heating the tooling piece including the layers of the fiber reinforced material on the tooling piece using an out-of-autoclave process.

25. The method of claim 23 wherein the drawing the vacuum about the tooling piece including the layers of fiber reinforced material on the tooling piece for at least the first predetermined process time includes drawing a vacuum about the tooling piece including the layers of fiber reinforced material on the tooling piece for a minimum time specified by a manufacturer of the fiber reinforced material.

26. The method of claim 23 wherein the applying the layers of the fiber reinforced material to the tooling piece to build up the layers of the fiber reinforced material on the tooling piece includes applying the layers of the fiber reinforced material to the tooling piece to build up a minimum number of layers of the fiber reinforced material on the tooling piece.

27. The method of claim 23 wherein the applying the layers of the fiber reinforced material to the tooling piece comprises selecting a fiber reinforced material comprising an epoxy material.

28. The method of claim 23 wherein the applying the layers of the fiber reinforced material to the tooling piece comprises selecting a fiber reinforced material comprising epoxy resin that gels at a temperature between about 240° F. and about 260° F.

29. A method of assembling an airfoil assembly having a leading edge and a skin panel that abuts the leading edge, the method comprising:
providing a closed-angle spar having an elongated flange portion, a web portion that forms an acute angle between the elongated flange portion and the web portion, and a radius portion interconnecting the web portion and the elongated flange portion, wherein the web portion has a web portion thickness and the elongated flange portion has an elongated flange portion thickness, wherein the web portion thickness is substantially equal to the elongated flange portion thickness, and wherein the radius portion has a radius portion thickness, and wherein the radius portion thickness is no more than 10 percent thinner than the web portion thickness and no more than 10 percent thinner than the elongated flange portion thickness; and
splicing the leading edge and the skin panel at a splice point along the elongated flange portion of the closed-angle spar.

30. The method of claim 29 wherein the acute angle faces forward of the airfoil assembly after the leading edge and the skin panel are spliced together.

31. The method of claim 29 wherein the web portion is located aft of the splice point where the leading edge and the skin panel are spliced together.

32. A method of fabricating the closed-angle composite airfoil spar of claim 1 comprising:
applying layers of a fiber reinforced material to a tooling piece to build up layers of the fiber reinforced material on the tooling piece and produce the closed-angle composite airfoil spar having an acute angle, wherein the fiber reinforced material comprises an epoxy material that facilitates controlled flow and is relatively less mobile while crosslinking.

33. The method of claim 32 wherein the epoxy material is a resin system with curatives that allow the epoxy material to gel relatively early on a temperature scale.

34. The method of claim 32 wherein the epoxy material gels at a temperature between about 240° F. and about 260° F.

35. The method of claim 32 further comprising:
drawing a vacuum about the tooling piece including the layers of fiber reinforced material on the tooling piece for at least a first predetermined process time;
heating the tooling piece including the layers of the fiber reinforced material on the tooling piece for at least a second predetermined process time; and
after elapse of the first predetermined process time, releasing the vacuum drawn about the tooling piece.

* * * * *